United States Patent [19]

Thigpen et al.

[11] 4,296,827
[45] Oct. 27, 1981

[54] AIR-GUN FIRE TIME SENSOR

[75] Inventors: Ben B. Thigpen; James A. Porter, Jr., both of Houston, Tex.

[73] Assignee: Western Geophysical Company of America, Houston, Tex.

[21] Appl. No.: 922,952

[22] Filed: Jul. 10, 1978

[51] Int. Cl.³ .......................... G01V 1/137; G01V 1/38
[52] U.S. Cl. ................................. 181/107; 181/111; 181/120; 367/144
[58] Field of Search ............... 181/107, 113, 115, 118, 181/120; 367/144

[56] References Cited

U.S. PATENT DOCUMENTS

| 3,687,218 | 9/1972 | Ritter | 181/107 |
| 3,985,199 | 10/1976 | Baird | 181/107 |
| 4,047,591 | 9/1977 | Ward et al. | 181/107 |
| 4,106,585 | 8/1978 | Huizer | 181/107 |
| 4,141,431 | 2/1979 | Baird | 181/120 |

Primary Examiner—Howard A. Birmiel
Attorney, Agent, or Firm—William A. Knox

[57] ABSTRACT

The resistive sensor consists of a pair of electrodes separated by an impervious insulating material. The sensor is mounted adjacent to an exhaust port of an airgun, in the path of the air blast that results when the gun is fired. When the air gun is submerged and not activated, the surrounding water creates a low-resistance path between the electrodes. When the gun is fired, the air blast blows the water away from the electrodes and the resistance between them abruptly increases substantially. A bridge circuit detects the instant of resistance change and generates an electrical transient to mark the time that the gun fired.

8 Claims, 4 Drawing Figures

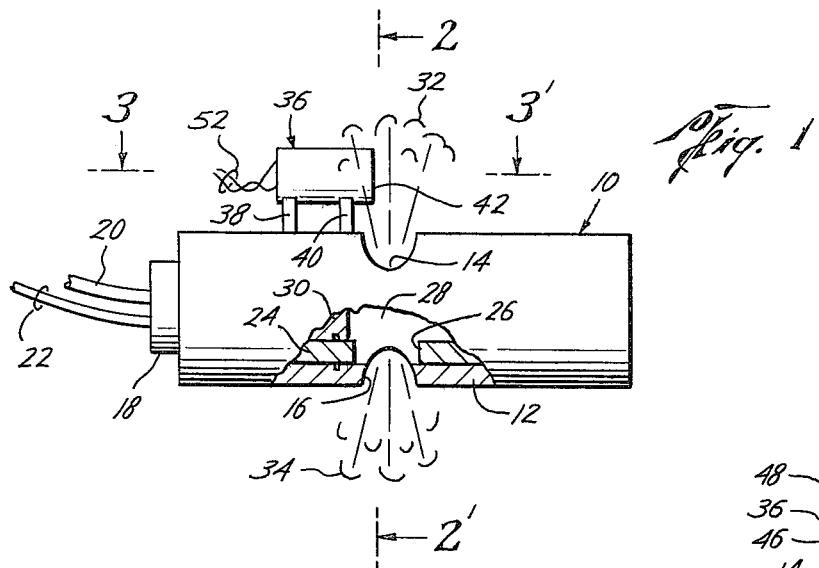
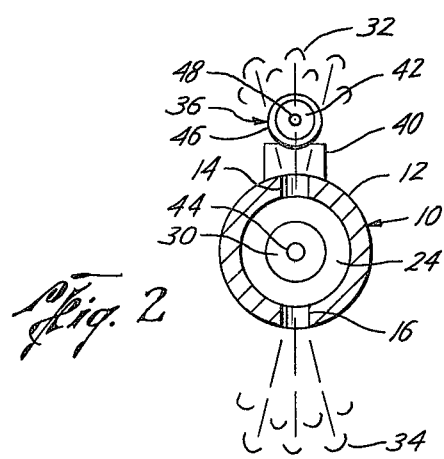
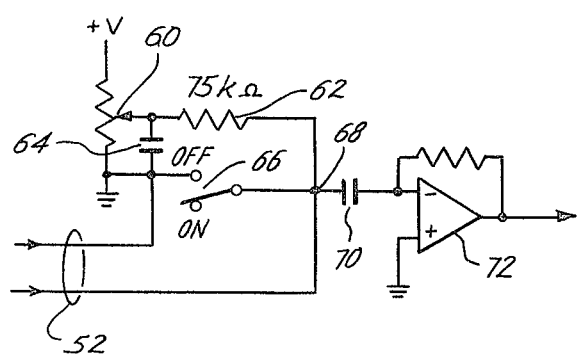

AIR-GUN FIRE TIME SENSOR

BACKGROUND OF THE INVENTION

1. Technical Field of the Invention

This invention is related to air guns in general and in particular, to the art of measuring the instant that the air gun creates an acoustic wave for use in seismic exploration.

2. Technical Description of the Prior Art

Air guns are widely used as sound sources in marine seismic exploration. A typical air gun is fired electrically by actuating a solenoid valve which, in turn opens a main valve. When the main valve opens, jets of compressed air are emitted through one or more exhaust ports to generate the desired acoustic pulse. Due to mechanical irregularities in gun construction, there is usually an irregular time delay between the time the solenoid is actuated and the time that the gun actually fires. Furthermore, no two air guns will necessarily exhibit the same free-time delay. Accordingly, various stratagems have been devised for determining the actual air-gun fire-time.

Many operators secure a hydrophone externally to the gun, some distance away from the gun exhaust ports. The first impulse detected by the hydrophone is considered the firing time. Other workers in the art measure the pressure-drop in the compressed air-line to the gun that occurs when the gun is fired. An example is disclosed in U.S. Pat. No. 3,985,199. In U.S. Pat. Nos. 4,034,827 and 4,047,591, a magnetic sensor is used to detect the instant that the main valve moves to open the exhaust ports. In co-pending U.S. Patent Application Ser. No. 749,547, assigned to the assignee of this invention, a pressure sensor is mounted inside the firing chamber of an air gun to detect a pressure change when the gun fires.

All of the above-described devices and many others of similar ilk are not completely satisfactory for reasons well known to geophysicists. Accordingly, we disclose a simle, sturdy, inexpensive device to determine the firing time of an air gun.

SUMMARY OF THE INVENTION

The air-gun firing detector of this invention consists of a pair of electrodes separated from one another by a solid, impermeable insulating material. The sensor has an active face that is finished to a flush, unobstructed surface so that the bare ends of the electrodes are exposed to the surrounding water. The active face of the sensor is mounted directly adjacent to an exhaust port of the air gun. When the sensor is immersed in salt or brackish water, the electrical resistance across the electrodes is minimal. When the gun fires, the air escaping from the exhaust port blows the water away from the active face of the sensor. As a result, the electrical resistance across the two electrodes abruptly increases substantially. The instant that the change in resistance occurs, is taken to be the gun firing time.

In a preferred embodiment of this invention, the insulating material is a plastic that is not substantially "wetted" so that it is readily blown dry by the escaping air.

BRIEF DESCRIPTION OF THE DRAWINGS

These and other advantages of this invention will be more readily understood by reference to the detailed description and the drawings wherein:

FIG. 1 is a side view, partially cut away, of an air gun with the resistive sensor attached thereto;

FIG. 2 is a cross section along line 2, 2' showing an end view of the resistive sensor;

FIG. 3 is a cross section along line 3, 3' showing the internal construction of the resistive sensor; and FIG. 4 is a diagram of a circuit useful in monitoring the change in resistance of the resistive sensor.

DETAILED DESCRIPTION OF THE INVENTION

Referring now to the drawings, FIG. 1 is a side view of an air gun 10 of any preferred design, such as the gun disclosed in co-pending U.S. patent application Ser. No. 749,548, now U.S. Pat. No. 4,121,154, assigned to the assignee of this invention and incorporated herein by reference. This air gun consists of an outer housing 12, exhaust ports 14, 16, solenoid actuating valve 18, a compressed-air supply hose 20 and solenoid signal cables 22. In operation, a sliding sleeve valve 24, is moved to the right to close exhaust ports 14, 16 when the valve 24 is in contact with seat 26. When the solenoid 18 is activated, sleeve valve 24 withdraws, as shown, into an annular chamber formed between housing 12 and an inner core 30, to open exhaust ports 14, 16, permitting compressed air jets 32, 34 to escape from firing chamber 28.

A resistive sensor comprising an electrode assembly 36 is mounted atop air gun 10 on sturdy support brackets 38, 40. Resistive sensor 36 has an active face 42 which is positioned adjacent to an exhaust port such as 14 so as to lie in the path of an air jet such as 32.

Referring now to FIG. 2 there is shown a cross section of gun 10 and an end view of electrode assembly 36. In FIG. 3 is shown a cross section of electrode assembly 36 along line 3, 3' of FIG. 1. Like parts in the figures bear the same part numbers. Not shown in FIG. 1, is a compressed-air inlet 44 shown in FIG. 2, bored through central core 30.

Assembly 36 is preferably formed from a heavy cylinder 46 of brass or some other material which will resist seawater corrosion. The cylinder may form one of a pair of concentric electrodes. The other electrode 48 may be a brass or copper rod sealed inside cylinder 46 by an insulating, non-permeable material 50 such as an epoxy resin. Prior to sealing, two wires 52 are connected to the two electrodes 46, 48 so that the resistance across electrodes 46, 48 may be measured. After sealing, electrodes 46 and 48 are insulated from one another. Wires pair 52 consist of a pair of flexible leads preferably #8 to #10 AWG so that they present minimal circuit resistance. The active face 42 of the electrode assembly 36 is finished, as by fine grinding, to a smooth flush surface, so that the bare ends of electrodes 46 and 48 are exposed to the surrounding water when immersed therein. The surface of active face 42 should be smooth so that there are no recesses to entrap water droplets when blown dry. Further, the physical characteristics of epoxy resin filler 50 are such that the material is not wettable by water; that is, water will not readily cling thereto.

In operation, when sleeve member 24 was closed and the gun submerged, the bare electrode ends were exposed to the surrounding water. Depending on the salinity of the water, the resistance across the electrodes through a water path as measured at leads 52, was 200 to 500 ohms. When the air gun was actuated to release an air jet such as 32, the air blew the water away from the electrode assembly and the resistance across the electrodes 46, 48 rose abruptly to about 20 megohms. The time of the abrupt resistance change is the firing instant of the gun. After the gun has fired, and the water returns to the cover the face 42 of the sensor, the resistance across the electrodes drops back to a few hundred ohms.

The resistance change due to firing of the gun is readily measured by a conventional bridge circuit. A preferred circuit is shown in FIG. 4. The purpose of the circuit is to provide a sharp electrical transient, of about 100 microseconds duration, in response to a concomitant change in resistance across the pair of electrodes 46, 48.

The circuit comprises a low-voltage adjustable power source such as potentiometer 60 and current limiter 62 represented by a 75,000-ohm resistor. A capacitor 64 serves as a line filter to reduce transient noise. Switch 66 disables the resistive sensor when not in use. When the electrical resistance across leads 52 is low, and switch 66 is ON, junction 68 is substantially short circuited and no significant voltage will exist between junction 68 and ground. When water is blown away from active face 42 of electrode assembly 36, the resistance across leads 52 suddenly increases to several hundred thousand ohms and a voltage will appear at junction 68. The resulting transient passes through DC blocking capacitor 70 to operational amplifier 72, which may be of any well known type such as a National Semiconductor LM-3018. The output signal from amplifier 72 may then be recorded or otherwise used, to indicate the firing time of the air gun 10.

It will be recognized from the above description, that when the bare electrode ends of electrode assembly 36 are exposed to the surrounding water, there will always be a current flow between the electrodes because of the low resistance. Current-limiting resistor 62 is introduced to limit the current flow to a few microamperes and thereby to inhibit electrode corrosion due to electrolysis.

The resistive sensor illustrated in the Figures is shown as a separate module 36, mounted on the gun 10 by supports 38 and 40, from which a pair of wires 52 extend to the circuit of FIG. 4. In an obvious alternate embodiment, the gun itself could serve as one electrode via a ground return and electrode 48 could take the form of a single insulated wire secured to the gun by a clamp of any desired design. In another embodiment of this invention an ordinary automotive spark plug could be substituted for the electrode assembly 36 shown in FIG. 3.

Changes may be made in the above described embodiment or in the arrangement of the elements therein without departing from the spirit or scope of this invention as defined in the following claims.

We claim as our invention:

1. A resistive sensor for determining the firing instant of an air gun that is used in seismic exploration in a body of water, the air gun including an air exhaust port for emitting a jet of compressed air, the sensor comprising:
   an electrode assembly exposed to the surrounding water mounted adjacent the air exhaust port; and
   means for detecting the change in electrical resistance across said electrode assembly when said air gun is fired.

2. The resistive sensor as defined in claim 1 wherein:
   said electrode assembly consists of a pair of electrodes separated from one another by an insulating material and having an active face which is finished to a flush, unobstructed surface so that the bare ends of the electrodes are exposed to the surrounding water.

3. The resistive sensor as defined in claim 2 wherein:
   the active face of the electrode assembly lies in the path of an air jet that is emitted when the gun is fired; and
   the electrical resistance across said pair of electrodes is low when exposed to the surrounding water and increases substantially when an emitted air jet blows the water away from the active face of the electrode assembly.

4. A method for detecting the firing instant of an air gun that is immersed in a body of water, said gun having an exhaust port for emitting an air jet each time said gun is fired, comprising the steps of:
   mounting an electrode on said gun adjacent to said exhaust port;
   establishing an electrical current flow between said electrode and said gun through the surrounding water; and
   detecting the change in current flow each time an air jet blows the water away from said electrode.

5. A marine gun for the production and timing of under water pulses comprising a body having an inlet for connection to a source of gas, at least one outlet port and means for controlling the discharge of gas under pressure through said port to produce an under water pulse, wherein said gun includes means for detecting the discharge of said gas, said detecting means including at least two electrodes both of which make electrical contact with the water surrounding the gun but are otherwise insulated from each other, wherein said electrodes form a gap in the path of the gas which is discharged from said port upon firing of the gun, such that firing of the gun produces an increase in the electrical resistance between said electrodes at the time of firing.

6. A gun according to claim 5, wherein one of said electrodes is provided by said body of the gun.

7. A gun according to claim 6, wherein the other of said electrodes is in the form of a length of wire the ends of which are connected to but insulated from said body of the gun.

8. A gun according to claim 5 in combination with an electrical circuit for producing an electrical signal upon firing of the gun, said circuit including a voltage source and a resistor connected in series with each other and with said electrodes.

* * * * *